(12) United States Patent
Hobert

(10) Patent No.: US 9,702,442 B2
(45) Date of Patent: Jul. 11, 2017

(54) ROTARY ACTUATORS WITH CHAIN OPERATED CAMS

(71) Applicant: Emerson Process Management, Valve Automation, Inc.

(72) Inventor: Harry Hobert, Hengelo (NL)

(73) Assignee: EMERSON PROCESS MANAGEMENT, VALVE AUTOMATION, INC., Houston, TX (US)

(*) Notice: Subject to any disclaimer, the term of this patent is extended or adjusted under 35 U.S.C. 154(b) by 0 days.

(21) Appl. No.: 14/930,919

(22) Filed: Nov. 3, 2015

(65) Prior Publication Data

US 2017/0122416 A1 May 4, 2017

(51) Int. Cl.
| | |
|---|---|
| *F16K 31/52* | (2006.01) |
| *F16H 21/44* | (2006.01) |
| *F16H 25/18* | (2006.01) |
| *F16H 37/12* | (2006.01) |
| *F16H 53/02* | (2006.01) |
| *F16K 31/46* | (2006.01) |
| *F15B 15/06* | (2006.01) |

(52) U.S. Cl.
CPC ............. *F16H 21/44* (2013.01); *F15B 15/06* (2013.01); *F16H 25/18* (2013.01); *F16H 37/12* (2013.01); *F16H 53/02* (2013.01); *F16K 31/465* (2013.01); *F16K 31/52* (2013.01)

(58) Field of Classification Search
CPC .......... F16H 21/44; F16H 25/18; F16H 53/02; F16H 37/12; F16K 31/524; F16K 31/465; F16K 31/46; F16K 31/52; F15B 15/06

USPC ......... 251/58, 229, 279, 294; 92/130 C, 132, 92/137

See application file for complete search history.

(56) References Cited

U.S. PATENT DOCUMENTS

| | | | | |
|---|---|---|---|---|
| 249,169 A | * | 11/1881 | Grannon ............. | F04B 43/0736 251/294 |
| 3,267,816 A | * | 8/1966 | Graham .................. | F15B 15/06 91/178 |
| 3,267,817 A | * | 8/1966 | Adams .................... | F15B 15/06 91/186 |
| 3,480,200 A | * | 11/1969 | Rohrer .................... | F04B 37/14 417/85 |
| 3,709,105 A | * | 1/1973 | Ridley .................... | F15B 15/06 92/137 |
| 4,295,630 A | * | 10/1981 | Card ..................... | F15B 20/002 92/137 |
| 4,869,459 A | * | 9/1989 | Bourne ............... | F16K 31/1635 251/280 |
| 5,007,330 A | * | 4/1991 | Scobie .................. | F15B 15/125 277/589 |

(Continued)

*Primary Examiner* — John Bastianelli
(74) *Attorney, Agent, or Firm* — Hanley, Flight & Zimmerman, LLC

(57) ABSTRACT

An example rotary actuator includes a cam that is to be coupled to a valve. The cam is rotatable about an axis. The example rotary actuator also includes a linear actuator having a stem movable along a path offset from and perpendicular to the axis and a chain having a first end and a second end opposite the first end. The first end of the chain is coupled to the stem and the second end of the chain coupled to the cam. The chain is disposed around at least a portion of an outer edge of the cam, and movement of the stem along the path rotates the cam about the axis.

20 Claims, 8 Drawing Sheets

(56) References Cited

U.S. PATENT DOCUMENTS

| | | | | |
|---|---|---|---|---|
| 5,263,449 A | * | 11/1993 | Swartzendruber | F16C 1/18 251/294 |
| 5,601,110 A | * | 2/1997 | Rembert | F15B 15/261 251/229 |
| 5,979,864 A | * | 11/1999 | Eggleston | F15B 15/10 251/58 |
| 6,860,189 B2 | * | 3/2005 | Perez | F15B 15/10 92/137 |
| 7,334,773 B2 | * | 2/2008 | Stout | F16K 31/465 251/294 |

* cited by examiner

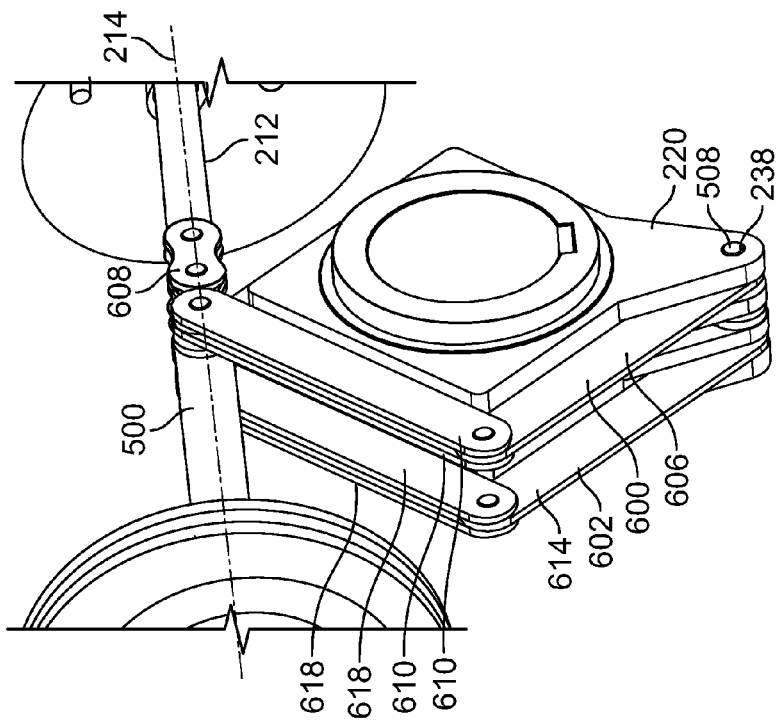
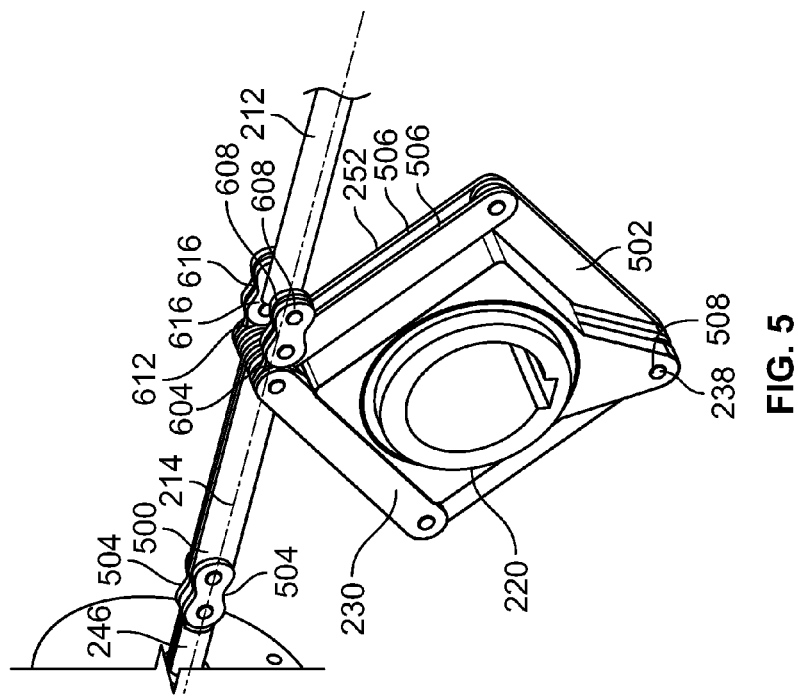

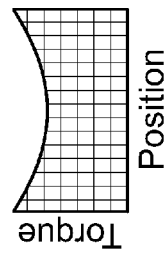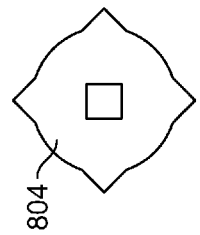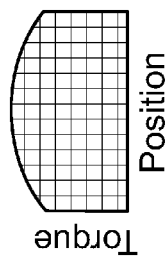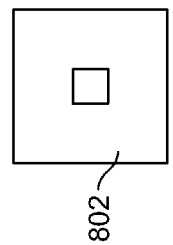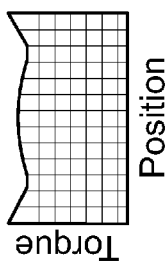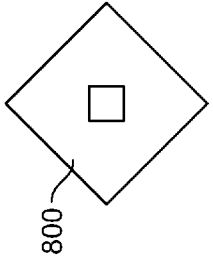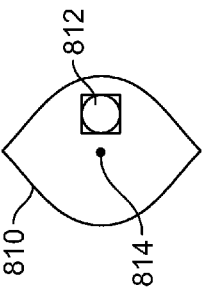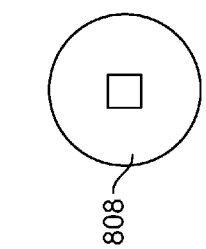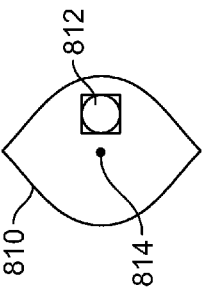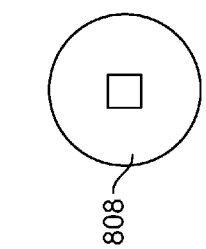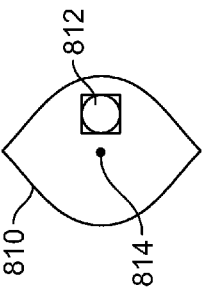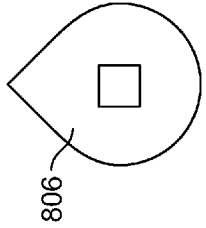
FIG. 8A  FIG. 8B  FIG. 8C  FIG. 8D  FIG. 8E  FIG. 8F

ROTARY ACTUATORS WITH CHAIN OPERATED CAMS

FIELD OF THE DISCLOSURE

This disclosure relates generally to rotary actuators and, more particularly, to rotary actuators with chain operated cams.

BACKGROUND

Many process control valves are operated using actuators. Actuators automate control valves by supplying force and motion to open or close a valve. Rotary valves such as butterfly valves, ball valves, disk valves, etc. typically have a valve shaft that drives a flow control member between an open position and a closed position. In particular, the flow control member of a rotary valve is typically rotated within a valve body passage to vary the flow of fluid therethrough. A rotary actuator is an actuator that that may be used to supply rotating force and motion to rotate the valve shaft of a rotary valve. Rotary actuators typically include an actuator stem that couples to the valve shaft.

A common type of rotary actuator is a scotch yoke rotary actuator, which converts linear motion to a quarter turn rotation motion. A scotch yoke rotary actuator includes a push rod that moves back-and-forth, via a linear actuator, along a rotatable shaft or stem that is offset from and perpendicular to the rod. The push rod is coupled to the rotatable shaft via a yoke or arm that converts linear motion to rotary movement of the shaft. In particular, the rod is coupled to the yoke by a pin that passes through a slot or opening in the yoke. As the rod moves back-and-forth, the pin causes the yoke to rotate (as the pin slides in the slot), thereby rotating the stem about its axis. Although effective for opening and closing a valve, scotch yoke rotary actuators have inefficiencies due to yoke friction and side forces. As mentioned above, as the rod translates, the pin slides along the inner surfaces of the slot. This sliding interaction generates friction, which decreases the efficiency of the rotary actuator. Additionally, due to sliding forces, not all of the linear force from the push rod is converted into rotational force. Instead, side forces are generated in the yoke, which are not converted into rotational force and, thus, also decreases the efficiency of the actuator.

SUMMARY

An example rotary actuator disclosed herein includes a cam that is to be coupled to a valve. In the example apparatus, the cam is rotatable about an axis. The example apparatus also includes a linear actuator having a stem movable along a first path offset from and perpendicular to the axis and a first chain having a first end and a second end opposite the first end. The first end of the first chain is coupled to the stem and the second end of the first chain coupled to the cam. In the example apparatus, the first chain is disposed around at least a portion of an outer edge of the cam, and movement of the stem along the first path rotates the cam about the axis.

Another example rotary actuator disclosed herein includes a power module having a first movable rod, a spring module having a second movable rod, a cam to be coupled to a valve, a first chain coupled between the first movable rod and the cam, and a second chain coupled between the spring module and the cam. The power module is to rotate the cam in a first direction and the spring module is to rotate the cam in a second direction opposite the first direction.

Yet another example rotary actuator disclosed herein includes a cam to be coupled to a stem of a valve. In the example rotary actuator, the cam is rotatable about a first axis. The example rotary actuator includes a first chain having a first end and a second end opposite the first end. The second end of the first chain is coupled to the cam, and the first chain encompasses at least a portion of an outer edge of the cam. The example rotary actuator also includes a second chain having a third end and fourth end opposite the third end. The third end of the second chain is coupled to the cam, and the second chain encompasses at least a portion of the outer edge of the cam. The example rotary actuator further includes first means for moving the first end of the first chain to rotate the cam in a first direction and second means for moving the third end of the second chain to rotate the cam in a second direction.

BRIEF DESCRIPTION OF THE DRAWINGS

FIG. 5 is an enlarged view of an example cam and example chains of the example rotary actuator of FIG. 2.

FIG. 6 is another enlarged view of the example cam and the example chains of the example rotary actuator of FIG. 2.

FIGS. 8A-8F illustrate example cam shapes and example torque curves that are generated by the respective cam shapes and which may be implemented in the example rotary actuator of FIG. 2.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Figure 1:
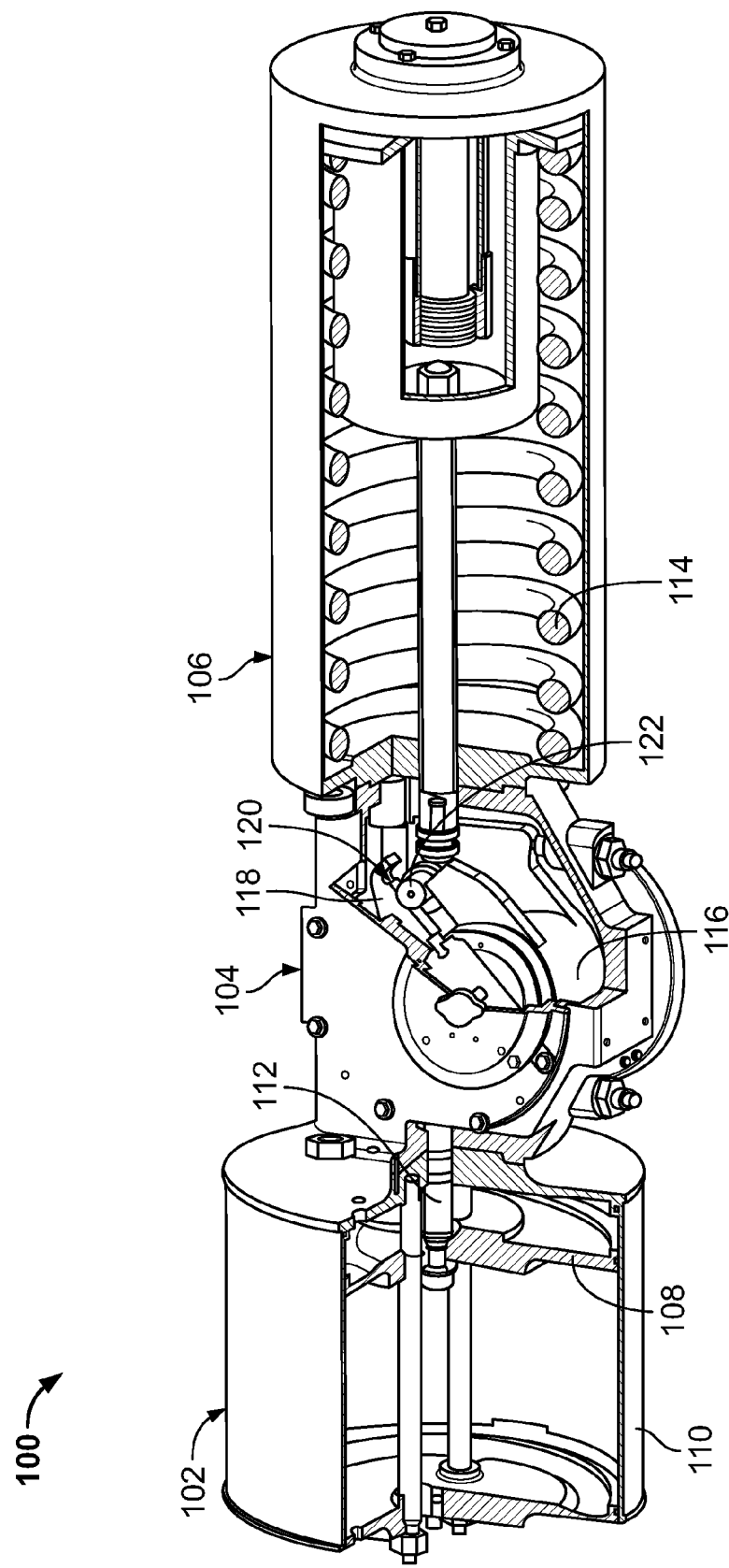
FIG. 1 is a partially sectioned view of a known scotch yoke rotary actuator.

Before describing the example chain operated rotary actuators, a brief discussion of known rotary actuators is first provided in connection with FIG. 1. In particular, a known scotch yoke rotary actuator 100 is shown in FIG. 1. Scotch yoke rotary actuators are generally lightweight and produce relatively high torque output, which is desirable for use with larger valves. The rotary actuator 100, which may be, for example, the BETTIS G-Series Pneumatic and Hydraulic Actuator made by Fisher®, a division of Emerson Process Management of St. Louis, Mo., may be used on a valve (e.g., a rotary valve) to automate the turning operations of a flow control member (e.g., a disc, a ball, etc.) within the valve. The rotary actuator 100 includes a power module 102, a transmission 104 and a spring module 106. In the illustrated example, the power module 102 is a linear actuator, which employs a piston 108 disposed within a cylinder 110 to provide linear movement to a push rod 112 (e.g., an output shaft). The power module 102 may be pneumatically or hydraulically actuated. The push rod 112 extends through the transmission 104 into the spring module 106. The spring module 106 includes a spring 114 to provide a counter biasing force (i.e., to move the push rod 112 in a direction opposite to that of the power module 102). The transmission 104 includes a rotatable shaft 116 that is to be coupled to a shaft (e.g., a stem, a spindle, etc.) of a valve. To rotate the shaft 116, the shaft 116 includes an arm or yoke 118 with a slot 120. A pin 122 carried by the push rod 112 is positioned within the slot 120. As the push rod 112 is translated back-and-forth along a linear path or axis, the pin 122 moves the yoke 118 (and slides within the slot 120), thereby causing the shaft 116 and a stem of a valve coupled thereto to rotate.

In FIG. 1, the rotary actuator 100 is in a first or unactuated state. To actuate the rotary actuator 100, pneumatic or hydraulic fluid is pumped into the cylinder 110 to move the piston 108 away from the spring 114 (or to the left in FIG. 1). The piston 108 pulls the push rod 112 into the cylinder 110, thereby moving the pin 122 along a linear axis. The pin 122 slides along the inner surface of the slot 120 and causes the yoke 118 to rotate in the counter-clockwise direction as seen from FIG. 1. The shaft 116 may be rotated a quarter turn (e.g., 90°) to a second or fully actuated state. As a result, the valve stem (which is operatively coupled to the shaft 116) is also rotated a quarter turn. In the second or fully actuated stated, the spring 114 is compressed and provides a biasing force in the opposite direction (to the right in FIG. 1). Therefore, when the power module 102 is deactivated or unactuated, the force from the spring 114 moves the push rod 112 in the opposite direction and, thus, returns the rotary actuator 100 to the first or unactuated state (as shown in the position in FIG. 1).

While effective for transforming linear motion to rotary motion, certain inefficiencies exist in scotch yoke rotary actuators. For example, friction is generated between the pin 122 and the slot 120 as the pin 122 slides along the inner surfaces of the slot 120, which decreases the efficiency of the rotary actuator 100. Additionally, over time this friction may cause wear or erosion of the parts of the rotary actuator 100, especially when operating relatively large and heavy valves that require high torque output. Further, as the yoke 118 rotates, the force supplied by the pin 122 is applied in different directions or vectors. Side forces (e.g., forces that are not perpendicular to the rotational axis of the yoke 118) are not converted into rotational motion and, thus, further decrease the efficiency of the rotary actuator 100.

Disclosed herein are example rotary actuators that have increased life span, have less friction and side forces than known scotch yoke rotary actuators, provide relatively high torque output, and are configurable to include different shape cams that may produce different torque curves. The example rotary actuators disclosed herein may replace scotch yoke rotary actuators. In general, the example rotary actuators include a cam that is to be coupled to a shaft (e.g., a stem, a spindle, etc.) of a valve, instead of a shaft with a yoke as used in many known scotch yoke rotary actuators. To rotate the cam, a first chain is coupled between a rod (e.g., a stem) of a power module and the cam. In particular, the power module is positioned such that the rod of the power module is movable along a generally linear path or axis that is at or near a perimeter or outer edge (e.g., an outer diameter) of the cam. The cam is rotatable about an axis (e.g., the axis of the valve stem) that is perpendicular to and offset from the path along which the rod moves. The first chain is wrapped around (e.g., encompasses) at least a portion of the cam. Thus, when the rod is moved, the first chain is pulled in a direction that rotates the cam with maximum torque (e.g., a path that is tangent to a diameter or radius defined by the outer edge of the rotating cam). For example, when the power module is activated, the rod is moved along the path away from the cam, thereby pulling on the first chain (which is disposed around the cam) and, thus, causes the cam to rotate between an unactuated state and a fully actuated state.

In some examples, to return the example rotary actuator to the unactuated state, a spring module is employed to provide a counter biasing force to the cam. In particular, a second chain may be coupled between a rod of the spring module and the cam. In some examples, the first chain and the second chain are coupled to the cam in the same location (e.g., at an opposite side of the cam relative to the path along which the rod(s) move). Similar to the first chain, the second chain is wrapped around at least a portion of the cam, but is wrapped about the cam in the opposite direction relative to the first chain. The spring module, similar to the power module, may be positioned such that the rod of the spring module is movable along a linear path or axis that is at or near the outer edge of the cam to generate maximum torque. When the power module is deactivated, the biasing force from the rod of the spring module pulls on the second chain and, thus, rotates the cam in the opposite direction. In some examples, the rod of the power module and the rod of the spring module are positioned such that the paths along which they translate are aligned (e.g., co-linear). For example, the power module and the spring module may be disposed on opposite sides of a housing that contains the cam. The example rotary actuators disclosed herein do not utilize a yoke or a pin sliding within a yoke. As a result, the inefficiencies related to yoke friction and side forces, as described above, are significantly reduced or eliminated. Thus, the example rotary actuators are more efficient than known rotary actuators.

In some examples, an additional power module and/or an additional spring module may be employed. For example, a second power module may be used to apply turning force to the cam. In such an example, a third chain is coupled between a rod of the second power module and the cam. The first power module and the second power module may be synchronized to rotate the cam. Additionally or alternatively, a second spring module may be used to provide a counter biasing force to return the cam to the unactuated state. In such an example, a fourth chain may be coupled between a rod of the second spring module and the cam. When the power module(s) are deactivated, the biasing force from the second spring module (in addition to the first spring module), causes the cam to rotate in the opposite direction and, thus, returns the cam to the unactuated state. In some examples, differently shaped cams may be employed in the example rotary actuators. The shape of the cam affects the torque characteristics of the rotary actuator. For example, the cam may have a substantially square shape, a circular shape, a teardrop shape, etc.

Figure 2:
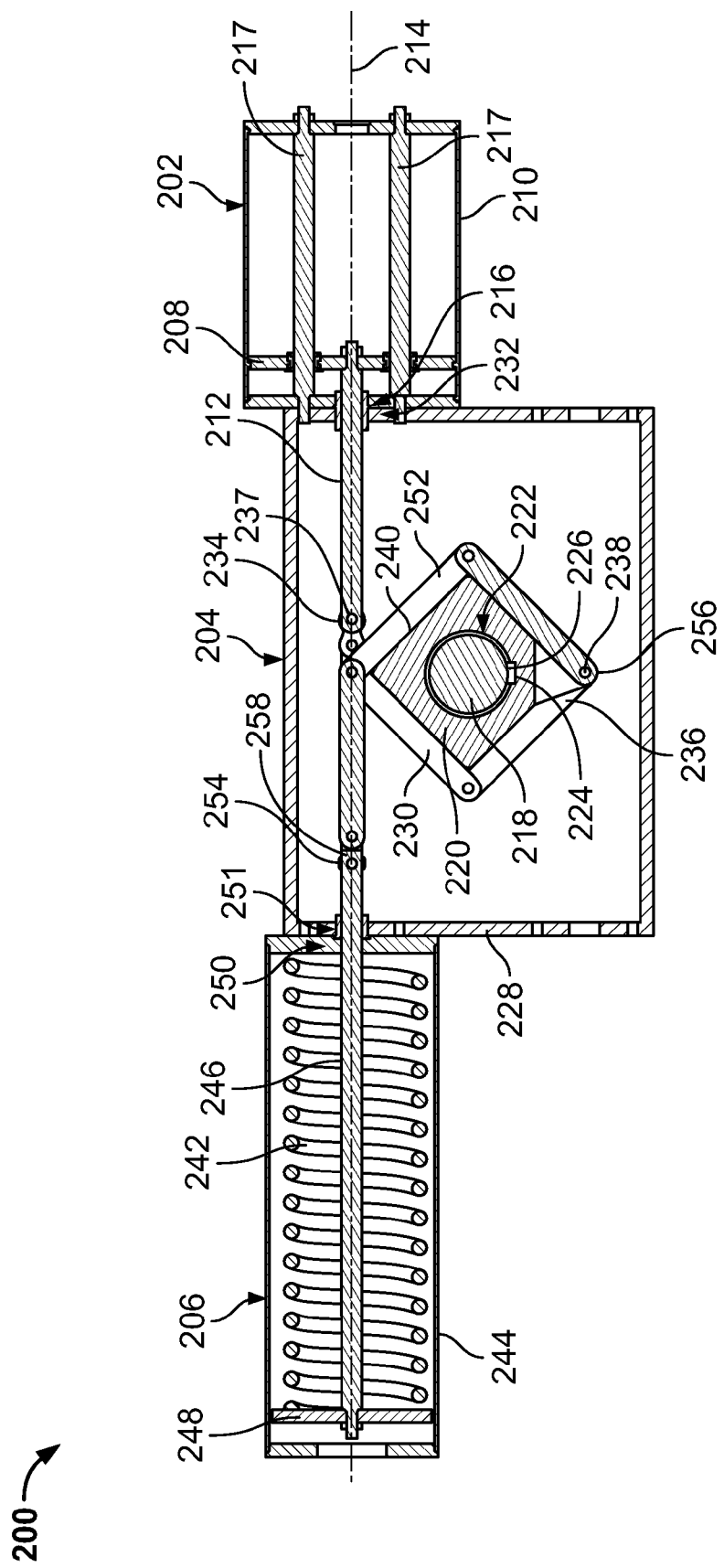
FIG. 2 is a cross-sectional view of an example rotary actuator in an unactuated state (e.g., a first state).
Figure 3:
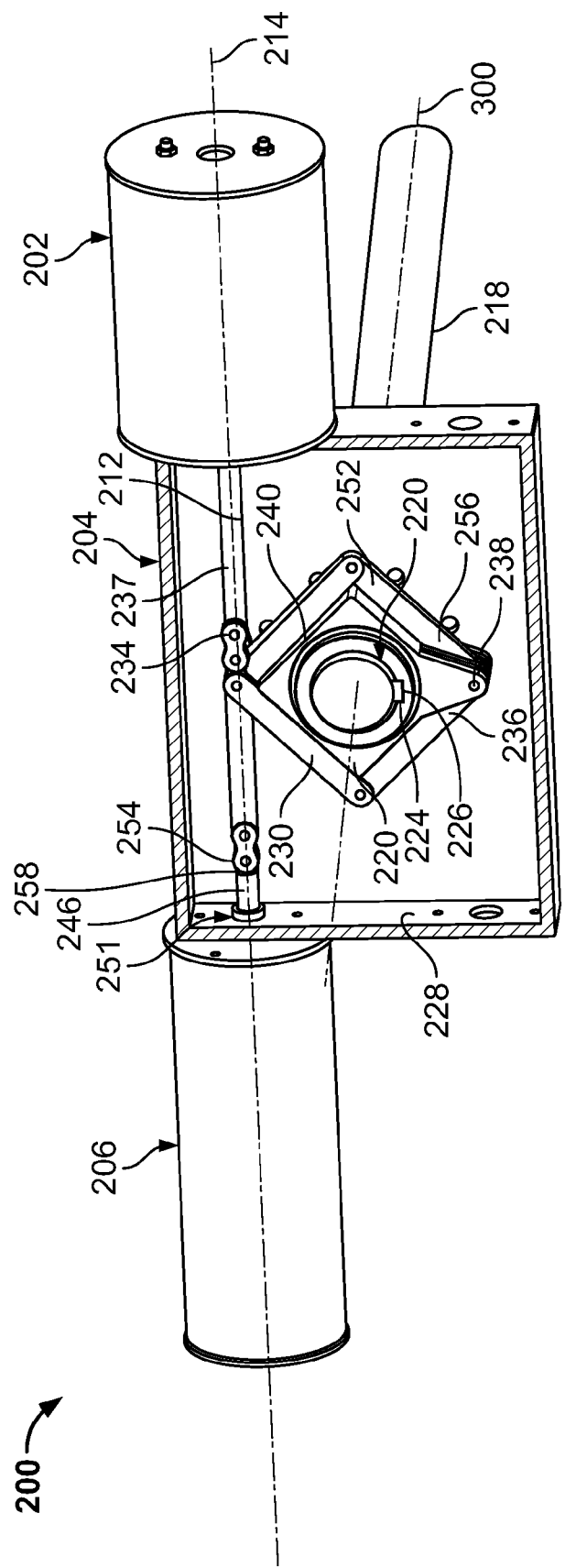
FIG. 3 is a partially sectioned view of the example rotary actuator of FIG. 2 in the unactuated state.

FIG. 2 is a cross-sectional view of an example rotary actuator 200 and FIG. 3 is a partially sectioned view of the example rotary actuator 200. The example rotary actuator 200 may be used in any process such as oil and gas pipeline distribution systems, chemical processing plants, refineries, pulp and paper processing stations, waste water facilities, etc. In particular, the example rotary actuator 200 may be used to operate a process control valve such as, for example, a butterfly valve, a ball valve or any other type of valve that utilizes rotational motion to operate a flow control member. For example, the rotary actuator 200 may be coupled to a valve and operate to turn or rotate a shaft (e.g., a stem, a spindle, etc.) of the valve. In the illustrated example, the rotary actuator 200 includes a power module 202, a transmission 204 and a spring module 206. The power module 202 and the spring module 206 may be similar to the power module 102 and the spring module 106, respectively, of FIG. 1. In particular, the power module 202 of the illustrated example is implemented as a linear actuator having a piston 208 (e.g., a disk) that is movably disposed within a cylinder 210 (e.g., a housing, a chamber, etc.). The piston 208 is coupled to a first rod 212 (e.g., a stem, a push rod, a piston pull-bar, etc.) and operates to move the first rod 212 along an axis or linear path 214 in and out of the cylinder 210 through an opening 216 (e.g., a bearing or bushing) in the cylinder 210. As shown, the path 214 along which the first rod 212 moves is coincident with the longitudinal axis of the first rod 212 (e.g., a longitudinal axis of the power module 202). One or more guide rods 217 may be disposed within the cylinder 210 to support and align the piston 208. Pneumatic or hydraulic fluid may be pumped into and/or out of the cylinder 210 on one side and/or the other side of the piston 208 to move the piston within the cylinder 210 and, thus, to move or translate the first rod 212 along the path 214.

To convert linear movement of the first rod 212 into rotary movement for turning a stem 218 (e.g., a shaft, a spindle, etc.) of a valve, the example rotary actuator 200 includes a cam 220 (e.g., a disk, a wheel with a lobe) having an opening 222 that receives the stem 218. The opening 222 may include a notch 224 to receive a protrusion or key 226 of the stem 218 that mates with the notch 224. The cam 220 is rotatably disposed within a housing 228 (e.g., a casing, an enclosure, a body, etc.). In the illustrated example of FIG. 3, a top wall or plate of the housing 228 has been removed (e.g., sectioned) to expose the internal parts and components of the transmission 204. However, it understood that the housing 228 may form or define a complete enclosure around the cam 220. The housing 228 may be coupled (e.g., via one or more fastening mechanism(s), such as bolts) to the valve.

As shown in FIG. 3, the cam 220 is rotatable about a longitudinal axis 300 of the stem 218 (i.e., the cam 220 is rotatable about an axis of the opening 222). In the illustrated example, the longitudinal axis 300 about which the cam 220 rotates is aligned with an axis intersecting a center or centroid of the cam 220 (e.g., a longitudinal axis of the cam 220). However, as discussed in further detail herein, in other examples the longitudinal axis 300 about which the cam 220 rotates may be different than (e.g., parallel to and offset from) a center axis (e.g., a longitudinal axis) of the cam 220.

Figure 4:
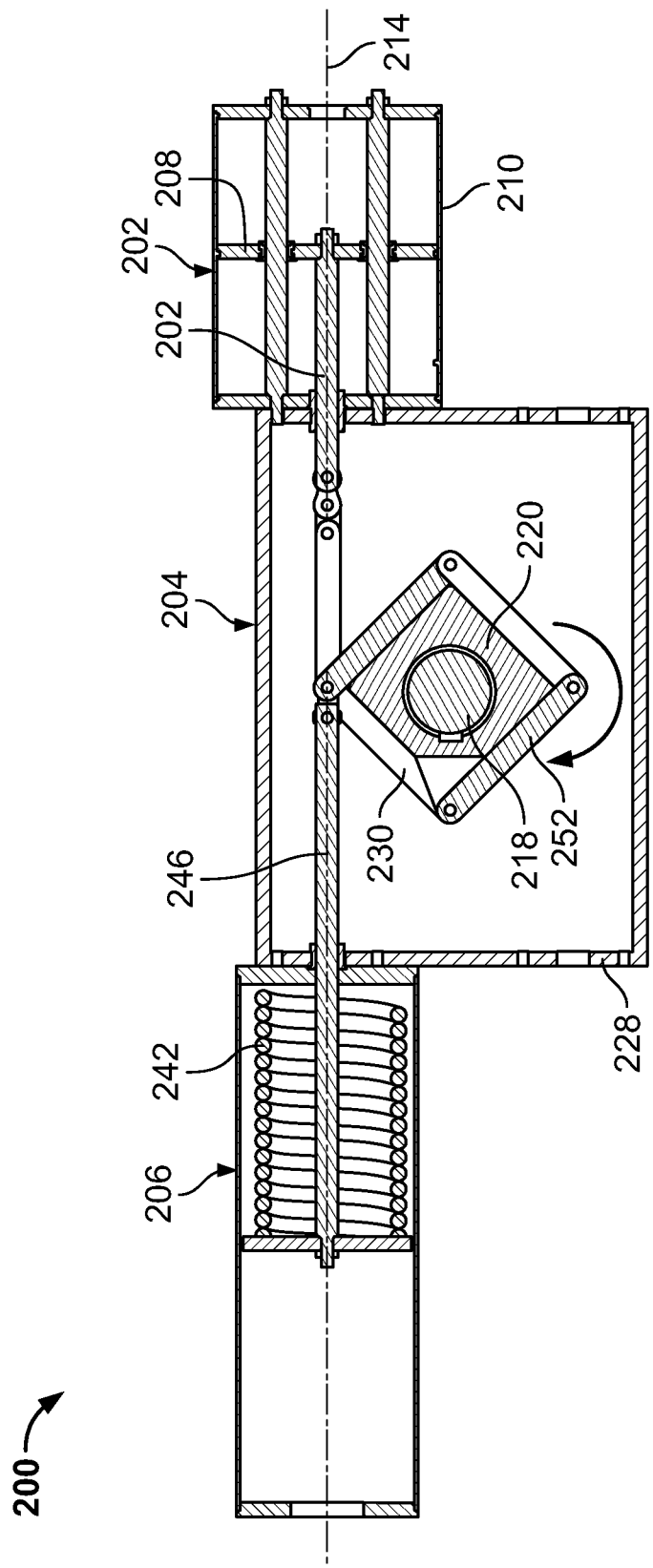
FIG. 4 is a cross-sectional view of the example rotary actuator of FIG. 2 in an actuated state (e.g., a second state).

To rotate the cam 220, a first chain 230 is coupled between the first rod 212 and the cam 220. The first rod 212 extends into the housing 228 through an opening 232 (FIG. 2) in the housing 228. The first chain 230 has a first end 234 and a second end 236 opposite the first end 234. The first end 234 of the first chain 230 is pivotally coupled to an end 237 of the first rod 212, and the second end 236 of the first chain 230 is pivotally coupled to the cam 220 at an attachment point 238. In the illustrated example, the attachment point 238 is on a bottom or distal side of the cam 220 relative to the first rod 212. When the power module 202 is actuated or activated, the first rod 212 is moved along the path 214 into the cylinder 210, thereby pulling the first chain 230 and, thus, rotating the cam 220 in the clockwise direction (in the orientation in FIGS. 2 and 3). The cam 220 is rotated between an unactuated state (e.g., a first position) as shown in the position of FIGS. 2 and 3 an active or actuated state (e.g., a second position) as shown in FIG. 4, which is discussed in further detail herein.

In the illustrated example, the first chain 230 is implemented as a roller chain (e.g., a leaf chain). In general, roller chains include a series of (e.g., at least two) links or plates that are coupled to adjacent links other via plates (e.g., outer links) and include roller pins (e.g., riveted pins). The first chain 230 may be any type of roller chain having any lacing combination (e.g., 2×2, 2×3, 3×4, etc.). In other examples, the first chain 230 may be implemented as any other type of chain such as a chain with torus-shaped links, an inverted tooth chain, or any other chain-like structure including a series of members (e.g., stretched steel plates) pivotably or movably coupled to adjacent members. Further, in other examples, the first chain 230 may be implemented as a cable (e.g., a steel cable), a belt or any other similar structure known to those of ordinary skill in the art.

As illustrated in the example of FIGS. 2 and 3, the path 214 along which the first rod 212 moves is perpendicular to and offset from the longitudinal axis 300 about which the cam 220 rotates. In the illustrated example, the power module 202 is positioned such that the path 214 is located at or near a perimeter or outer edge 240 of the cam 220 (e.g., at or near a diameter or circle defined by the edge 240 of the cam 220). As a result, the first rod 212 pulls the first chain 230 along a path that is substantially tangential to the edge 240 of the cam 220, thereby providing maximum torque to the cam 220.

In the illustrated example, the first chain 230 is disposed around (e.g., wrapped around, encompassing, encircling, surrounding, etc.) a portion of the cam 220 (e.g., the left side of the cam 220 as shown in FIGS. 2 and 3). In other examples, the first chain 230 may encompass more or less of the cam 220 (e.g., depending on the length of the first chain 230 and/or the position of the attachment point 238).

To rotate the cam 220 in the reverse or counter-clockwise direction and return the cam to the unactuated state, the example rotary actuator 200 includes the spring module 206. As illustrated in FIG. 2, the spring module 206 includes a spring 242 disposed within a housing 244. A second rod 246 (e.g., a stem, a push rod, a spring pull-bar, etc.) is coupled to a spring retainer 248, which engages the spring 242. As illustrated in FIGS. 2 and 3, the second rod 246 extends through an opening 250 in the housing 244 of the spring module 206 and into the housing 228 of the transmission 204 though an opening 251 in the housing 228.

As illustrated in the example of FIGS. 2 and 3, a second chain 252 is coupled between the second rod 246 and the cam 220. The second chain 252 has a first end 254 and a second end 256 opposite the first end 254. In the illustrated example, the first end 254 of the second chain 252 is pivotally coupled to an end 258 of the second rod 246, and the second end 256 of the second chain 252 is pivotally coupled to the cam 220 at the attachment point 238. In the illustrated example, the second chain 252 wraps around (e.g., is disposed around) the cam 220 along an opposite side (e.g., the right side) of the cam 220 relative to the first chain 230. The spring 242 biases the second rod 246 toward the left side in FIG. 2, which pulls the second chain 252 to rotate the cam 220 (and, thus, the stem 218) in the counter-clockwise direction. In other words, the spring module 206 provides a counter biasing force to return the rotary actuator 200 to an unactuated state (e.g., the position shown in FIGS. 2 and 3).

In the illustrated example, the first rod 212 and the second rod 246 are aligned (e.g., coaxial, have a same longitudinal axis) and translate along the same path 214, which is disposed at or near the edge 240 of the cam 220. As such, the pulling force provided by the power module 202 or the spring module 206 can generate maximum torque on the cam 220. Similar to the first chain 230, the second chain 252 may be implemented as any chain (e.g., a roller chain, a chain with torus-shaped links), a cable, a belt or any other similar structure known to those of ordinary skill in the art.

FIG. 4 shows an example of the rotary actuator 200 in the active or actuated state. When the power module 202 is activated or actuated, the piston 208 of the power module 202 is moved to the right, which moves the first rod 212 along the path 214. The first rod 212 pulls the first chain 230 and, thus, rotates the cam 220 and the stem 218 in the clockwise direction (as shown by the arrow). As the cam 220 rotates in the clockwise direction, the second chain 252 is disposed around the cam 220 and pulls the second rod 246 outward along the path 214, thereby compressing the spring 242 in the spring module 206. When the power module 202 is deactivated (e.g., when the pneumatic or hydraulic fluid to removed from the cylinder 210), the spring 242 moves the second rod 246 to the left, which pulls the second chain 252 and, thus, rotates the cam 220 in the counter-clockwise position back to the unactuated state (e.g., the position shown in FIGS. 2 and 3). In the illustrated example, the spring module 206 provides a safety shut-off or failsafe feature. For example, if the power module 202 is inoperable, the spring 242 biases the cam 220 to the unactuated state (e.g., the position shown in FIGS. 2 and 3) to close (or open) the valve, depending on the desired failsafe position of the valve.

In the illustrated example, the spring module 206 uses the spring 242 to provide a biasing force to rotate the cam 220 in the reverse or counter-clockwise direction. In other examples, the spring module 206 may be implemented as an actuator, such as a linear actuator, similar to the power module 202. In such an example, this linear actuator may operate similar to but opposite of the power module 202. For example, this linear actuator may be activated or actuated to pull the second chain 252 and, thus, rotate the cam 220 in the counter-clockwise direction. Therefore, the power module 202 and/or the spring module 206 may be implemented as any type of electrical or mechanical actuator to move the respective first and second rods 212, 246.

In the illustrated example, the power module 202 operates to turn the cam 220 about 90° (i.e., a quarter turn) between the unactuated state and the actuated state. However, because the first chain 230 wraps around or encompasses about 180° degrees of the cam 220, the cam 220 may be rotated up to about 180° (e.g., depending the travel of the first rod 212). In other examples, the first chain 230 may be wrapped around the cam 220 more than 180°. In such examples the cam 220 can be rotated more than 180°. For example, the first chain 230 may be wrapped around the cam 220 one full turn (e.g., 360°) enable the cam 230 to be rotated one full turn.

In the illustrated example of FIGS. 2, 3 and 4, the housing 228 of the transmission 204 is substantially rectangularly-shaped. However, it is understood that the housing 228 may be formed in other shapes or geometries. In the illustrated example, the power module 202 and the spring module 206 are disposed on opposite sides of the transmission 204. In other examples, the power module 202 and the spring module 206 may be on the same side of the transmission 204. For example, the spring module 206 may be disposed beneath the power module 202, such that the second rod 246 moves along a path that is at near the outer edge 240 of the cam 220 but opposite to that of the path 214. In such an example, the second chain 252 may be wrapped around or disposed along the same side of the cam 220 as the first chain 230. The cam 220 may include another attachment point (e.g., a second attachment point), opposite the attachment point 238 (e.g., a first attachment point), wherein the second chain 252 may be pivotally coupled to the cam 220.

In the illustrated example, the first and second chains 230, 252 are constructed of a series of interlaced links or plates that are coupled to each other via roller pins. The links are elongated members that may be made of steel, for example. Each of the links is pivotably coupled to a preceding and/or succeeding link. In the illustrated example, the links are relatively large and substantially match or correspond to the length of the outer surfaces (e.g., the straight sides) of the cam 220. In other examples, the first and second chains 230, 252 may have more or fewer links. For example, the first and second chains 230, 252 may have more links than illustrated in FIGS. 2, 3 and 4, such that more than one link may be disposed along each of the sides of the cam 220. In some examples, the first and second chains 230, 252 may include different numbers of links. In some examples, the links of the first chain 230 and/or the second chain 252 may have different lengths.

FIGS. 5 and 6 show enlarged views of the cam 220 and the first and second chains 230, 252. In FIGS. 5 and 6 the housing 228 of the transmission 204 and the stem 218 have been removed for clarity. As mentioned above, in the illustrated examples the first and second chains 230, 252 are constructed of a series of interlaced links or plates (e.g., inner links and outer links). For example, as illustrated in FIG. 5, the second chain 252 includes a first inner link 500 and a second inner link 502. The first inner link 500 is coupled to the second rod 246 by first outer links plates 504, and the first inner link 500 is coupled to the second inner link 502 by second outer links 506. The second inner link 502 is pivotably coupled to the cam 220 at the attachment point 238 via a pin 508.

In the illustrated example, the first rod 212 and the second rod 246 are aligned along the path 214 (e.g., are co-linear). As illustrated, the first chain 230 wraps around one side of the cam 220 and the second chain 252 wraps around the opposite side of the cam 220. As shown in FIG. 6, to accommodate the first and second chains 230, 252 along the top of the cam 220, the first chain 230 is divided into first and second parallel chains 600, 602 that straddle or separate around the second chain 252. Similar to the second chain 252, the first and second parallel chains 600, 602 each include a series of interlaced links that are coupled to each other via roller pins (e.g., riveted pins). For example, the first parallel chain 600 includes a first inner link 604 (FIG. 5) and a second inner link 606. The first inner link 604 of the first parallel chain 600 is pivotally coupled to the first rod 212 via first outer links 608, and the first inner link 604 is coupled to the second inner link 606 via second outer links 610. The second inner link 606 of the first parallel chain 600 is pivotally coupled to the cam 220 at the attachment point 238 via the pin 508. Similar to the first parallel chain 600, the second parallel chain 602 includes a first inner link 612 (FIG. 5) and a second inner link 614. The first inner link 612 of the second parallel chain 602 is pivotally coupled to the first rod 212 via first outer links 616 and the first inner link 612 of the second parallel chain 602 is coupled to the second inner link 614 of the second parallel chain 602 via second outer links 618. The second inner link 614 of the second parallel chain 602 is pivotally coupled to the cam 220 at the attachment point 238 via the pin 508.

In the illustrated example the first and second chains 230, 252 are coupled to the cam 220 at the same location (i.e., the attachment point 238). However, in other examples, the first and second chain 230, 252 may be pivotably coupled to the cam 220 at other attachment points (e.g., not the same as each other). In some examples, only one of the first or second parallel chains 600, 602 may be used. In some examples, the first rod 212 and the second rod 246 may be parallel to and offset from each other (e.g., not coaxial).

Figure 7:
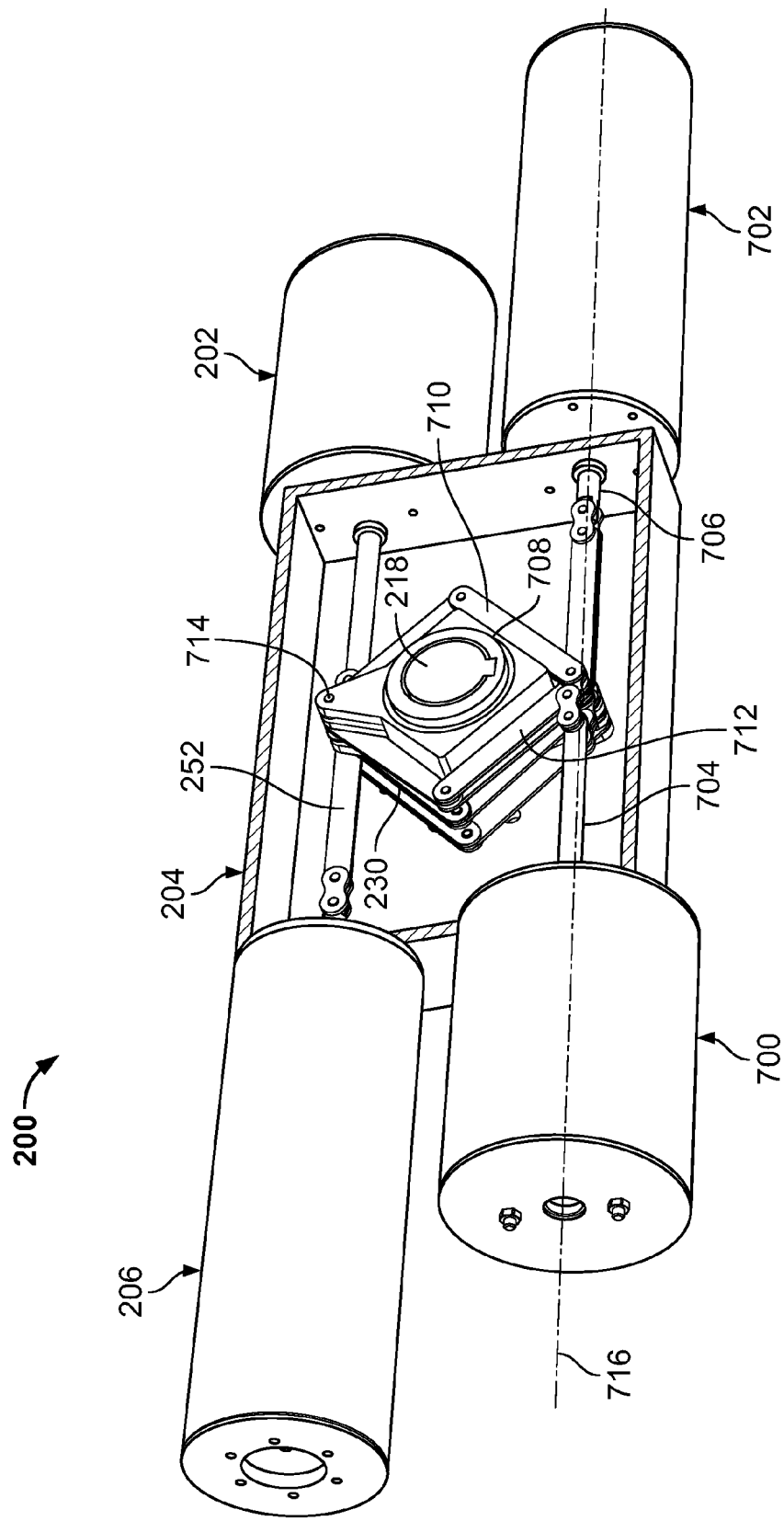
FIG. 7 is a partially sectioned view of the example rotary actuator of FIG. 2 employing a second power module and a second spring module.

In some examples, another power module and/or another spring module may be employed on the example rotary actuator 200. FIG. 7, for example, is a partially sectioned view of the example rotary actuator 200 having a second power module 700 and a second spring module 702. In the illustrated example, the second power module 700 is disposed on the same side of the transmission 204 as the spring module 206 (i.e., the first spring module 206), and the second spring module 702 is disposed on the same side of the transmission 204 as the power module 202 (i.e., the first power module 202). Similar to the first power module 202 and the first spring module 206, the second power module 700 and the second spring module 702 are disposed on opposite sides of the transmission 204 than each other. The second power module 700 has a third rod 704 that extends into the transmission 204 and the second spring module 702 has a fourth rod 706 that extends into the transmission 204. In the illustrated example, a cam 708 having a relatively larger depth is implemented. A third chain 710 is coupled between the third rod 704 and the cam 708, and a fourth chain 712 is coupled between the fourth rod 706 and the cam 708. In particular, the third chain 710 and the fourth chain 712 are coupled to the cam 708 at a second attachment point 714, opposite to that of the attachment point 238 (e.g., the first attachment point 238). The third chain 710 wraps around or encompasses a portion of the cam 708 opposite of the first chain 230, and the fourth chain 712 wraps around or encompasses a portion of the cam 708 opposite of the second chain 252. Similar to the first power module 202, when the second power module 700 is actuated, the third rod 704 is retracted into the second power module 700, thereby pulling the third chain 710 and, thus, rotating the cam 708 and the stem 218 in the clockwise direction to the actuated position. The first and second power modules 202, 700 may be synchronized to operate substantially simultaneously. When the first and second power modules 202, 700 are deactivated, the fourth rod 706 of the second spring module 702 pulls the fourth chain 712 and, thus, rotates the cam 708 in the counter-clockwise direction back to the unactuated position (e.g., the position shown in FIG. 7). In other words, the first and second power modules 202, 700 may operate in unison to rotate the cam 708 in one direction, and the first and second spring modules 206, 702 provide opposite or counter biasing force to rotate the cam 708 in the other direction.

In the illustrated example, the second power module 700 and the second spring module 702 are positioned such that the third rod 704 and the fourth rod 706 are translated along a path 716 (e.g., are co-linear). However, in other examples, the third rod 704 and the fourth rod 706 may be parallel but offset from each other. Any of the chains 230, 252, 710, 712 may include more or fewer links and the links may be relatively shorter or longer than the links illustrated. Further, as disclosed herein, any of the chains 230, 252, 710, 712 may be implemented as any type of chain, a cable, a belt or any other similar structure known to those of ordinary skill in the art.

In the illustrated examples of FIGS. 2-7, the cam 220 and the cam 708 are substantially square-shaped. FIGS. 8A-8F illustrate alternative example cam shapes and corresponding torque curves generated by the corresponding cams. The torque curves plot or map the torque generated by the cam (along the Y-axis) against the rotational position of the cam (along the X-axis). In general, the torque curves are generated assuming there is no counter force. FIG. 8A illustrates a first cam 800, which has substantially the same shape as the example cam 220 and the example cam 708 in FIGS. 2-7 (i.e., a square-shaped cam). FIG. 8B illustrates a second cam 802, which also has a substantially square-shape. However, the second cam 802 of FIG. 8B is oriented such that the non-actuated or resting position is different than the non-actuated or resting position of the first cam 800 in FIG. 8A. In particular, the second cam 802 in FIG. 8B has been rotated 45° compared to the first cam 800 in FIG. 8A. As a result, the torque generated by the second cam 802 throughout its rotation is different than the first cam 800. FIG. 8C illustrates a third cam 804, which is substantially square-shaped with curved or wavy (e.g., non-linear) sides. FIG. 8D illustrates a fourth cam 806 having a teardrop or water-drop shape. FIG. 8E illustrates a fifth cam 808, which has a substantially circular or round shape. As shown in the corresponding torque curve of FIG. 8E, the fifth cam 808 produces constant torque throughout the position of the fifth cam 808. FIG. 8F illustrates a sixth cam 810, which has the shape of an oval with pointed ends (e.g., similar to the outline of a lemon). In the illustrated example of FIG. 8F, the sixth cam 810 has an eccentric pivot point or rotational axis 812. In other words, the axis 812 about which the sixth cam 810 rotates (i.e., the axis along which a stem or spindle of a valve is disposed) is parallel to but offset from centroid 814 of the sixth cam 810. In other examples, the pivot point may be coaxial with the centroid 814 of the sixth cam 810. Similarly, any of the other cams 800, 802, 804, 806, 808 may have an eccentric rotational axis. The shape and/or the location of the rotational axis can be designed to produce to different torques, depending on the specific application. In some examples, an eccentric cam (e.g., similar to the sixth cam 810) can be used to counter the force from the spring module (e.g., the spring module 206 of FIG. 2) to produce a substantially linear torque curve throughout the rotation of the cam.

Figure 9:
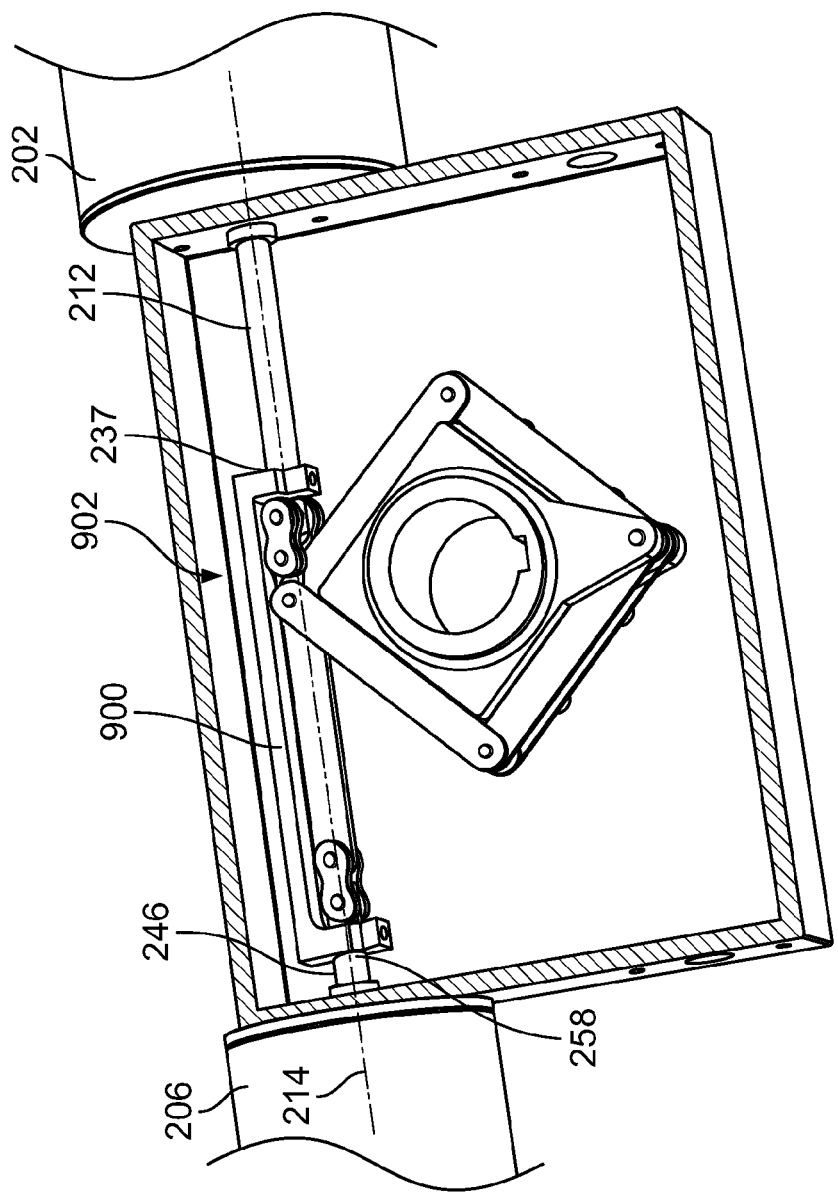
FIG. 9 is a partially sectioned view of the example rotary actuator of FIG. 2 having an example link coupling an example rod of an example power module to an example rod of an example spring module.

In some examples, the first rod 212 and the second rod 246 of the example rotary actuator 200 (FIG. 2A) may be coupled to each other (directly or indirectly via one or more links) or may be formed of a single unitary piece or structure, such that a substantially single rod (which extends into the power module 202 and the spring module 206) moves back-and-forth along the path 214. For example, FIG. 9 illustrates an example link 900 (e.g., a connecting rod, a tie rod, etc.) that couples the first rod 212 and the second rod 246. In the illustrated example, the link 900 is coupled between the end 237 of the first rod 212 and the end 258 of the second rod 246. The link 900 may be coupled to the first rod 212 and/or the second rod 246 via one or more fasteners (e.g., a screw), welding, threaded connection(s) and/or any other suitable fastening mechanism(s). As a result, the first and second rods 212, 246 form a substantially single rod 902 that is movable along the path 214. In some examples, the single rod 902 is a substantially unitary piece or structure.

The single rod 902 in this example supports a more controlled movement between the forces of the power module 202 and the spring module 206, and side loads can be more easily controlled.

From the foregoing, it will be appreciated that the above disclosed example rotary actuators generate significantly less friction and side forces than known scotch yoke rotary actuators. As a result, there is less wear (e.g., due to sliding or rolling forces) in the example rotary actuators and, thus, the example rotary actuators have an increased efficiency and lifespan. Further, the example rotary actuators generate relatively higher torque with the same size actuator. In other words, the size or envelope of the example rotary actuators may be substantially the same as known rotary actuators while producing relatively higher torque.

Further, the example rotary actuators may be easily configured to employ differently shaped cams to produce different torque curves, as desired. Additionally, while the examples rotary actuators disclosed herein are described in connection with rotary valves, it is understood that the example rotary actuators may be used on any other type of valve, such as linear valves (e.g., a plug valve, a globe valve) through the use of louvers, dampers and/or other rotating/transmission mechanisms.

Although certain example apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A rotary actuator comprising:
   a rotatable member to be coupled to a valve, the rotatable member rotatable about a first axis, the rotatable member being substantially square-shaped;
   a linear actuator having a first stem movable along a second axis offset from and perpendicular to the first axis; and
   a first chain having a first end and a second end opposite the first end, the first end of the first chain coupled to the first stem and the second end of the first chain coupled to the rotatable member, the first chain disposed around at least a portion of an outer edge of the rotatable member, wherein movement of the first stem along the second axis rotates the rotatable member about the first axis, and wherein the first chain includes a plurality of links, a first link disposed along and having a substantially same length as a side of the rotatable member.

2. The rotary actuator of claim 1, wherein the second axis is at or near the outer edge of the rotatable member.

3. The rotary actuator of claim 1 further including:
   a second stem movable along a third axis parallel to or co-linear with the second axis; and
   a second chain having a third end and a fourth end opposite the third end, the third end of the second chain coupled to the second stem and the fourth end of the second chain coupled to the rotatable member.

4. The rotary actuator of claim 3, wherein the second chain is disposed around at least a portion of the outer edge of the rotatable member.

5. The rotary actuator of claim 4, wherein the second chain is disposed around the rotatable member in a direction opposite the first chain.

6. The rotary actuator of claim 3, wherein the first and second chains are pivotably coupled to the rotatable member at a same location via a pin.

7. The rotary actuator of claim 3 further including a spring coupled to the second stem to bias the second stem.

8. The rotary actuator of claim 7, wherein, when the linear actuator is actuated, the first stem pulls the first chain to rotate the rotatable member in a first direction and wherein, when the linear actuator is not actuated, the second stem pulls the second chain to rotate the rotatable member in a second direction opposite the first direction.

9. The rotary actuator of claim 3, wherein the linear actuator is a first linear actuator and the second stem is included in a first spring module, further including:
   at least one of a second linear actuator or a second spring module; and
   a third chain coupled between the second linear actuator or the second spring module and the rotatable member.

10. The rotary actuator of claim 1, wherein the first axis about which the rotatable member rotates is parallel to and offset from a central axis of the rotatable member.

11. A rotary actuator comprising:
    a power module having a first rod movable along an axis;
    a spring module having a second rod movable along the axis;
    a link coupling the first rod and the second rod;
    a rotatable member to be coupled to a valve;
    a first chain coupled between the first rod and the rotatable member, the power module to rotate the rotatable member in a first direction; and
    a second chain coupled between the spring module and the rotatable member, the spring module to rotate the rotatable member in a second direction opposite the first direction.

12. The rotary actuator of claim 11, wherein the rotatable member is substantially square-shaped.

13. The rotary actuator of claim 11, wherein the rotatable member is substantially circular.

14. The rotary actuator of claim 11, wherein the rotatable member includes an opening to receive a stem of the valve.

15. The rotary actuator of claim 14, wherein the rotatable member is rotatable about a longitudinal axis of the stem of the valve.

16. The rotary actuator of claim 15, wherein the longitudinal axis of the stem is aligned with a central axis of the rotatable member.

17. The rotary actuator of claim 15, wherein the longitudinal axis of the stem is parallel to and offset from a central axis of the rotatable member.

18. A rotary actuator comprising:
    a rotatable member to be coupled to a stem of a valve and rotatable about a first axis;
    a first chain having a first end and a second end opposite the first end, the second end of the first chain coupled to the rotatable member, the first chain encompassing at least a portion of an outer edge of the rotatable member, the first chain including a plurality of links, a first link disposed along and having a substantially same length as a straight side of the rotatable member;
    a second chain having a third end and fourth end opposite the third end, the third end coupled to the rotatable member, the second chain encompassing at least a portion of the outer edge of the rotatable member;
    first means for moving the first end of the first chain to rotate the rotatable member in a first direction; and
    second means for moving the third end of the second chain to rotate the rotatable member in a second direction.

19. The rotary actuator of claim 18, wherein the first means is to move the first end of the first chain along an axis that is at or near the outer edge of the rotatable member.

20. The rotary actuator of claim 18, wherein the second end of the first chain and the fourth end of the second chain are pivotably coupled to the rotatable member via a pin.

\* \* \* \* \*